United States Patent
Garrett et al.

(10) Patent No.: US 6,804,428 B1
(45) Date of Patent: Oct. 12, 2004

(54) OPTICAL SPECTRAL POWER MONITORS EMPLOYING POLARIZATION DEVERSITY SCHEME

(75) Inventors: Mark H. Garrett, Morgan Hill, CA (US); Jeffrey P. Wilde, Morgan Hill, CA (US); Pavel G. Polynkin, Fremont, CA (US)

(73) Assignee: Capella Photonics, Inc., San Jose, CA (US)

( * ) Notice: Subject to any disclaimer, the term of this patent is extended or adjusted under 35 U.S.C. 154(b) by 291 days.

(21) Appl. No.: 10/022,303

(22) Filed: Dec. 14, 2001

Related U.S. Application Data

(63) Continuation-in-part of application No. 09/992,778, filed on Nov. 14, 2001, now Pat. No. 6,504,976.

(51) Int. Cl.$^7$ .............................. G02B 6/12; H04J 14/00
(52) U.S. Cl. .............................. 385/24; 385/11; 385/15; 385/31; 385/37; 385/1; 398/52; 398/98; 398/75; 398/84; 398/47
(58) Field of Search ........................... 385/1, 2, 10, 11, 385/14, 31, 37, 33, 42, 39, 15, 16; 398/52, 98, 101, 103, 47, 43, 48, 75, 87, 45, 65

(56) References Cited

U.S. PATENT DOCUMENTS

| | | | |
|---|---|---|---|
| 6,239,891 B1 | 5/2001 | Nakama | 385/24 |
| 6,275,623 B1 * | 8/2001 | Brophy et al. | 385/14 |
| 2002/0131698 A1 | 9/2002 | Wilde | 385/31 |

OTHER PUBLICATIONS

PCT Search Report dated Apr. 14, 2003 corresponding to PCT/US02/30013.

* cited by examiner

Primary Examiner—Akm Enayet Ullah
Assistant Examiner—Kevin S. Wood
(74) Attorney, Agent, or Firm—Gray Cary Ware & Freidenrich LLP

(57) ABSTRACT

This invention provides a method and apparatus for spectral power monitoring by use of a polarization diversity scheme. In the present invention, a multi-wavelength optical signal is first decomposed into first and second polarization components, and the second polarization component is subsequently rotated by 90-degrees, prior to impinging onto a diffraction grating that provides a higher diffraction efficiency for the first polarization component. The diffraction grating separates the first and second polarization components by wavelength respectively into first and second sets of optical beams, impinging onto an array of optical power sensors. The inventive optical spectral power monitoring apparatus thus is able to minimize the insertion loss, while providing enhanced spectral resolution. Further, by modulating the first and second sets of optical beams prior to impinging onto the optical power sensor array, the present invention enables an optical power spectrum associated with each polarization component in the multi-wavelength optical signal to be separately determined.

25 Claims, 3 Drawing Sheets

OPTICAL SPECTRAL POWER MONITORS EMPLOYING POLARIZATION DEVERSITY SCHEME

CROSS-REFERENCE TO RELATED APPLICATIONS

This application is a Continuation-in-part of U.S. patent application Ser. No. 09/992,778, filed on Nov. 14, 2001, which is incorporated herein by reference in its entirety, and which claims priority of U.S. patent application Ser. No. 09/961,565, filed on Sep. 20, 2001.

FIELD OF THE INVENTION

This invention relates generally to optical systems. More specifically, it relates to a novel class of optical spectral power monitors in which polarization-sensitive effects are mitigated and the insertion loss is minimized. The optical spectral power monitors of the present invention are particularly suited for DWDM optical networking applications.

BACKGROUND

Dense wavelength division multiplexing (WDM) has become prevalent in optical communication networks, in response to high bandwidth (or capacity) demand. Along with the deployment of DWDM technology comes a need for a new generation of optical components and subsystems, including optical spectral (or channel) power monitors. A particularly desirable feature for these new optical spectral power monitors is the ability to resolve multiple spectral channels that occupy a broad spectrum range (e.g., C- or L-band) with increasingly narrower frequency spacing (e.g., 50 or 25 GHz). These optical spectral power monitors are also desired to be fast in response time, robust in performance, and cost-effective in construction.

Conventional spectral power monitors typically make use of an architecture in which a diffraction grating separates a multi-wavelength optical signal by wavelength into a spatial array of spectral channels, impinging onto an array of optical power sensors. By detecting the electrical signals thus produced by the optical power sensors, an optical power spectrum of the multi-wavelength optical signal can be derived. In order to provide enhanced spectral resolution in such a system, a diffraction grating with sufficient dispersion capability is required. High-dispersion diffraction gratings commonly known in the art (e.g., holographic gratings), however, are characteristically polarization-sensitive, rendering them unsuitable for the optical spectral power monitors employing the aforementioned architecture.

In view of the foregoing, it would be an advance in the art to overcome the prior limitations and provide a new type of optical spectral power monitors with enhanced spectral resolution in a simple and cost-effective construction.

SUMMARY OF THE INVENTION

The present invention provides a method and apparatus for spectral power monitoring by use of a polarization diversity scheme. The optical spectral power monitoring apparatus of the present invention comprises an input port for a multi-wavelength optical signal; a polarization-separating element that decomposes the multi-wavelength optical signal into first and second polarization components; a polarization-rotating element that rotates the polarization of the second polarization component by 90-degrees; a wavelength-disperser that separates the first and second polarization components by wavelength respectively into first and second sets of optical beams; and an array of optical power sensors (termed "optical-sensing array" herein) positioned to receive the first and second sets of optical beams.

In an exemplary embodiment of the present invention, the input port may be a fiber collimator, and the wavelength disperser may be a diffraction grating. In the event that the diffraction grating may provide higher diffraction efficiency for a p (or TM) polarization component than for an s (or TE) polarization component, the aforementioned first and second polarization components may correspond to the p-polarization and s-polarization components of the input multi-wavelength optical signal, respectively.

In situations where the first and second optical beams associated with the same wavelength are desired to impinge at substantially the same location (or within the same optical power sensor) on the optical-sensing array, an auxiliary polarization-rotating element may be implemented such that the first and second sets of optical beams are polarized in two orthogonal directions upon impinging onto the optical-sensing array. This eliminates any intensity interference fringes that may arise from the spatial overlap of the optical beams. The auxiliary polarization-rotating element may be disposed between the wavelength-disperser and the optical-sensing array, such that either of the first and second sets of optical beams undergoes a 90-degree rotation in polarization prior to impinging onto the optical-sensing array.

Alternatively, a modulation assembly may be utilized in the present invention to modulate the first and second sets of optical beams prior to impinging onto the optical-sensing array. The first and second sets of optical beams may be modulated to arrive at the optical-sensing array in a time-division-multiplexed sequence. The first and second sets of optical beams may alternatively be modulated in a frequency-division-multiplexed fashion, such that the first and second sets of optical beams impinging onto the optical-sensing array carry distinct "dither" modulation signals. In either case, the use of such a modulation assembly enables the first and second sets of optical beams to be separately detected, whereby an optical power spectrum (optical power level as a function of wavelength) associated with each orthogonal polarization component in the input multi-wavelength optical signal can be independently derived. The modulation assembly may be disposed along the optical path between the polarization-separating element along with the polarization-rotating element and the wavelength-disperser, thereby controlling the first and second polarization components. It may alternatively be implemented between the wavelength-disperser and the optical-sensing array, so as to control the first and second sets of optical beams.

The modulation assembly may comprise liquid crystal shutter elements, MEMS (micro-electro-mechanical-systems) shutter elements, or electro-optic intensity modulating elements known in the art. The modulating assembly may also be provided by an optical beam-chopper (e.g., a rotating disk equipped with at least one aperture), configured to introduce distinct modulations in two incident optical signals.

In the present invention, the polarization-separating element may be a polarizing beam splitter, a birefringent beam displacer, or other types of polarization-separating means known in the art. The polarization-rotating element (or the auxiliary polarization-rotating element) may be a half-wave plate, a liquid crystal rotator, a Faraday rotator, or any other suitable polarization-rotating means known in the art. The optical-sensing array may be provided by a photodiode array, or other types of optical power sensing elements known in the art. The wavelength-disperser may generally be a ruled diffraction grating, a holographic diffraction grating, a curved diffraction grating, an echelle grating, a transmission grating, a dispersing prism, or other types of wavelength-separating means known in the art. The input port may be a fiber collimator, coupled to an input optical fiber (e.g., a single mode fiber) transmitting the multi-wavelength optical signal.

The employment of the aforementioned polarization diversity scheme enables the optical spectral power monitoring apparatus of the present invention to minimize the insertion loss, while providing enhanced spectral resolution in a simple and cost-effective construction (e.g., by advantageously making use of high-dispersion diffraction gratings commonly available in the art). Further, by introducing distinct modulations to the first and second sets of optical beams prior to impinging onto the optical-sensing array, an optical power spectrum associated with each polarization component in the input multi-wavelength optical signal can be separately determined, which might be desirable in some applications.

As such, the present invention provides a new type of optical spectral power monitors with enhanced spectral resolution and minimized insertion loss, that can be utilized in a variety of applications including DWDM optical networking applications.

The novel features of this invention, as well as the invention itself, will be best understood from the following drawings and detailed description.

DETAILED DESCRIPTION

Figure 1:
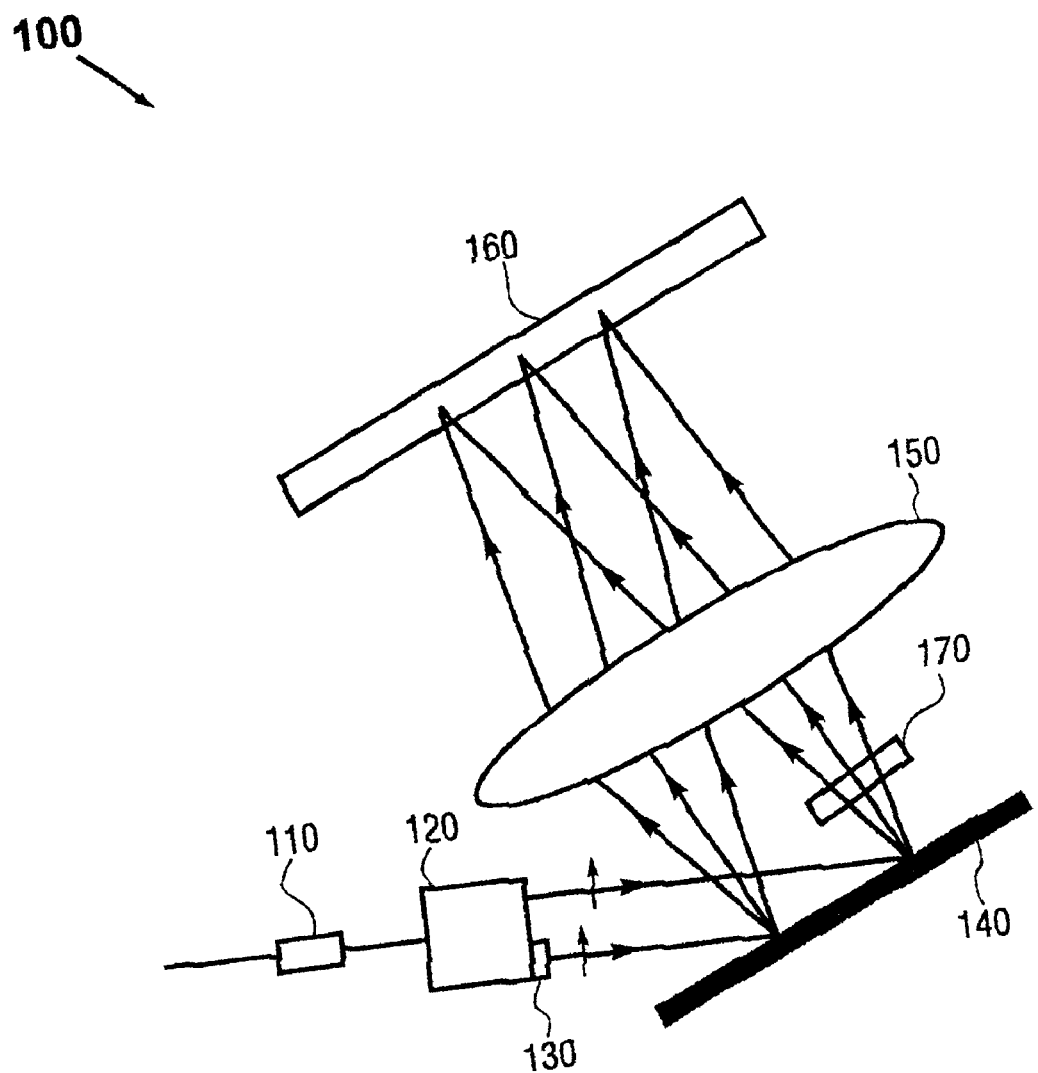
FIG. 1 shows a first embodiment of an optical spectral power monitoring apparatus of the present invention.

FIG. 1 shows an exemplary embodiment of an optical spectral power monitoring apparatus of the present invention. By way of example to illustrate the principles and the general architecture of the present invention, optical spectral power monitoring apparatus 100 comprises an input port 110 for a multi-wavelength optical signal which may be in the form of a fiber collimator; a polarization-separating element 120 which in one form may be a polarizing beam splitter; a polarization-rotating element 130 which may be a half-wave plate; a wavelength disperser 140 which in one form may be a diffraction grating, a beam-focuser 150 which may be a focusing lens; and an array of optical power sensors 160 (termed "optical-sensing array," herein).

The principal operation of the optical spectral power monitoring apparatus 100 of FIG. 1 may be as follows. The input port 110 transmits a multi-wavelength optical signal (which may contain wavelengths $\lambda_1$ through $\lambda_N$, for instance). The polarization-separating element 120 decomposes the multi-wavelength optical signal into a p (or TM) polarization component (perpendicular to the groove lines on the grating) and an s (or TE) polarization component (orthogonal to the p-polarization component) with respect to the diffraction grating 140. (The polarization and s-polarization components may also be termed "first and second polarization components.") As a way of example, assuming that p-polarization is the "preferred direction" of the diffraction grating 140 (i.e., the diffraction efficiency is higher for p-polarization than for s-polarization), the polarization-rotating element 130 subsequently rotates the polarization of the s-polarization component (or the second polarization component) by 90-degrees, whereby the optical signals incident upon the diffraction grating 140 all possess p-polarization. The diffraction grating 140 angularly separates the incident optical signals by wavelengthrespectively into first and second sets of optical beams (wherein each set contains optical beams with wavelengths $\lambda_1$ through $\lambda_N$, for instance). The focusing lens 150 may subsequently focus the diffracted optical beams into corresponding focused spots, such that the first and second optical beams associated with the same wavelength (e.g., $\lambda_i$) impinge at substantially the same location (or within the same optical power sensor) on the optical-sensing array 160. (It should be appreciated that in this specification and appending claims, the rotation in polarization produced by a polarization-rotating element (e.g., the polarization-rotating element 130) may be construed as having slight variations about a prescribed angle (e.g., 90-degrees), due to imperfections that may exist in a practical system. Such variations, however, will not significantly affect the overall performance of the invention.

The aforementioned overlap of the first and second optical beams (polarized in the same direction and characterized by the same wavelength) may give rise to coherent interference that may produce undesirable intensity fringes. To avoid such a situation, an auxiliary polarization-rotating element 170 may be implemented in the embodiment of FIG. 1, whereby the first and second sets of optical beams are polarized in two orthogonal directions prior to impinging onto the optical-sensing array 160. The auxiliary polarization-rotating element may be implemented between the diffraction grating 140 and the optical-sensing array 160, and serves to rotate the polarization of either the first or second set of optical beams by 90-degrees prior to impinging onto the optical-sensing array 160. By way of example in FIG. 1, an auxiliary polarization-rotating element 170 may be disposed between the diffraction grating 140 and the focusing lens 150, such that the first set of optical beams undergoes a 90-degree rotation in polarization prior to impinging onto the optical-sensing array 160. It should be appreciated that the auxiliary polarization-rotating element 170 may alternatively be disposed between the diffraction grating 140 and the focusing lens 150 in such a way that the second set of optical beams undergoes a 90-degree rotation in polarization prior to impinging onto the optical-sensing array 160. In either scenario, the first and second optical beams associated with the same wavelength (e.g., $\lambda_i$) become polarized in two orthogonal directions upon impinging onto the optical-sensing array 160, thereby eliminating any coherent intensity interference.

As such, by advantageously employing the aforementioned polarization diversity scheme, the polarization sensitivity of the diffraction grating 140 becomes inconsequential in the optical spectral power monitoring apparatus 100. This enables the apparatus of the present invention to enhance spectral resolution in a simple and cost-effective construction (e.g., by making use of high-dispersion diffraction gratings commonly available in the art), while providing improved accuracy in optical spectral power detection.

Figure 2:
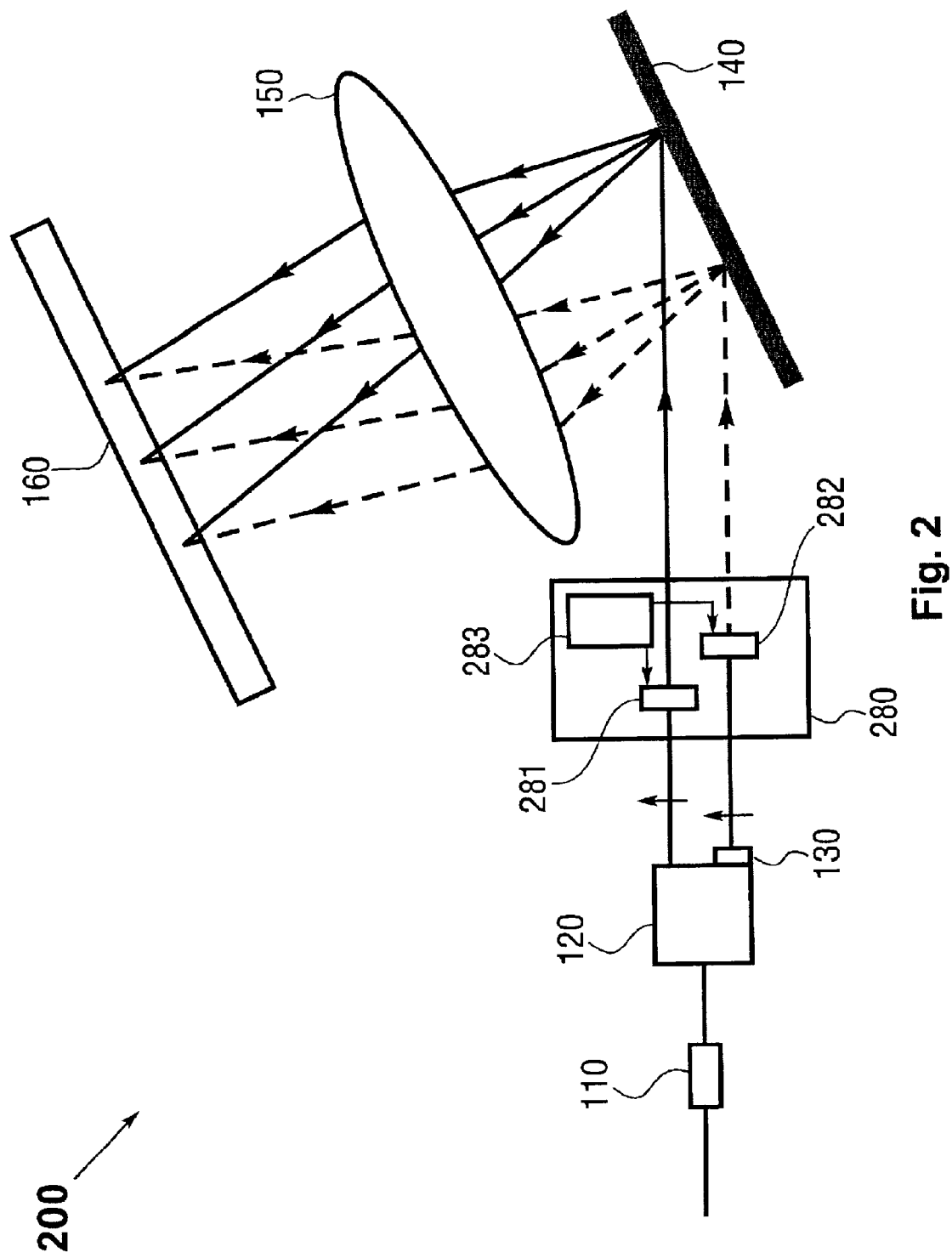
FIG. 2 depicts a second embodiment of an optical spectral power monitoring apparatus of the present invention.

FIG. 2 depicts a second embodiment of an optical spectral power monitoring apparatus according to the present invention. By way of example, optical spectral power monitoring apparatus 200 may make use of the general architecture along with a number of the elements employed in the embodiment of FIG. 1, as indicated by those elements labeled with identical numerals. In this case, a modulation assembly 280 may be implemented, and configured such that the first and second sets of optical beams impinge onto the optical-sensing array 160 in a time-division-multiplexed (e.g, alternating) fashion. By way of example, the modulation assembly 280 is shown to be in the form of first and second shutter-elements 281, 282 along with a control unit 283, disposed along the optical path between the polarization-separating element 120 along with the polarization-rotating element 130 and the diffraction grating 140, thereby controlling the first and second polarization components, respectively. Either of the first and second shutter-elements 281, 282 may be configured such that it permits an optical signal to pass through under an appropriate control signal (e.g., provided by the control unit 283); and stays closed to the incident optical signal in the absence of any control signal. Hence, by operating the first and second shutter-elements 281, 282 in an alternating manner according to a suitable control scheme by way of the control unit 283, the first and second sets of optical beams impinge onto the optical-sensing array 160 in a time-division-multiplexed sequence, as illustrated by solid and dashed lines in phantom. This enables the first and second sets of optical beams to be separately detected, whereby an optical power spectrum associated with each polarization component in the input multi-wavelength optical signal can be independently derived. One skilled in the art will appreciate that the first and second shutter-elements 281, 282 (along with the control unit 283) may alternatively be implemented between the diffraction grating 140 and the optical-sensing array 160, thereby providing a substantially similar function by controlling the first and second sets of optical beams, respectively.

In the aforementioned embodiment, the modulation assembly 280 may alternatively be provided by an optical beam-chopper (along with associated control unit), such as an opaque rotating disk equipped with at least one aperture, or any other suitable means known in the art that allows two incident optical signals to pass through in an alternating fashion. The optical beam-chopper may be implemented along the optical path between the polarization-separating element 120 along with the polarization-rotating element 130 and the diffraction grating 140, or between the diffraction grating 140 and the optical-sensing array 160, thus providing a substantially similar function in a substantially equivalent manner.

In the embodiment of FIG. 2, the first and second sets of optical beams may each have a predetermined alignment with the underlying optical-sensing array 160. Alternatively, the first and second optical beams associated with the same wavelength (e.g., $\lambda_i$) may impinge at substantially the same location (albeit at different times) on the optical-sensing array 160. The optical-sensing array 160 may comprise a photodiode array (e.g., a photodiode array from Sensors Unlimited, Inc., Princeton, N.J.), or other suitable optical power sensing means known in the art. A skilled artisan will know how to implement a suitable optical-sensing array and devise an appropriate detection scheme, to best suit a given application.

Like the embodiment of FIG. 1, the optical spectral power monitoring apparatus 200 is polarization insensitive with respect to the diffraction grating 140, and is therefore capable of providing accurate detection of the multi-wavelength optical signal with enhanced spectral resolution. An additional advantage of the optical spectral power monitoring apparatus 200 is that by impinging the first and second sets of optical beams onto the optical-sensing array in a time-division-multiplexed fashion, an optical power spectrum associated with each polarization component in the input multi-wavelength optical signal can be independently determined, which would be useful in optical networking applications. For instance, polarization multiplexing—the encoding of data streams onto two orthogonal polarization components of a single wavelength channel-has emerged as another way of increasing the information capacity of an optical fiber. Hence, it would be desirable to have a device that can separately detect two orthogonal polarization components of a single wavelength channel.

Figure 3:
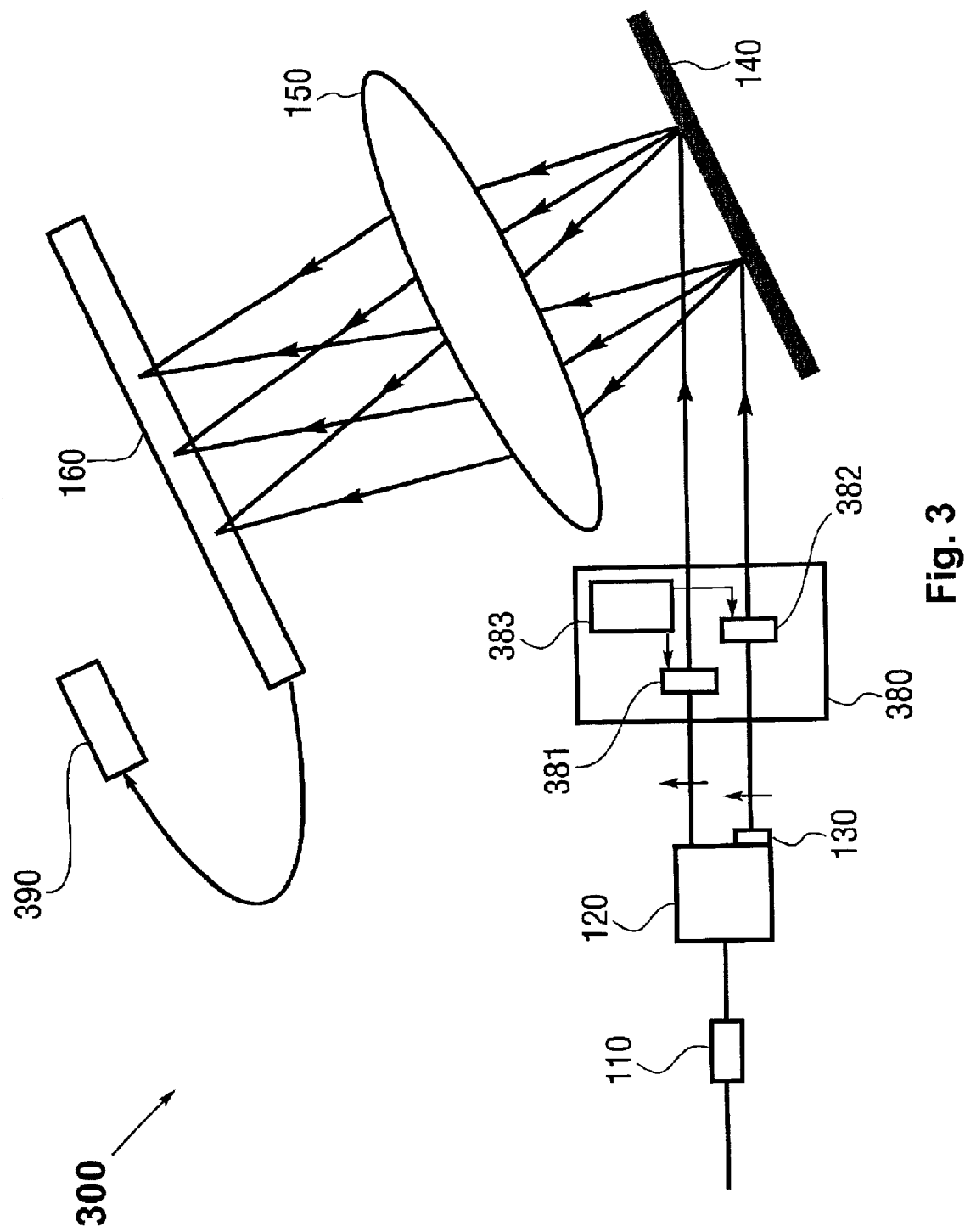
FIG. 3 shows a third embodiment of an optical spectral power monitoring apparatus of the present invention.

Those skilled in the art will recognize that the aforementioned function of the modulation assembly 280 may be generalized to modulate the first and second sets of optical beams in a frequency-division-multiplexed fashion, whereby they can be separately identified on the optical-sensing array 160. FIG. 3 shows a third embodiment of an optical spectral power monitoring apparatus, pertaining to this situation. By way of example, optical spectral power monitoring apparatus 300 may make use of the general architecture along with a number of the elements employed in the embodiment of FIG. 2, as indicated by those El elements labeled with identical numerals. In this case, a modulation assembly 380 may be disposed along the optical path between the polarization-separating element 120 along with the polarization-rotating element 130 and the diffraction grating 140, serving to modulate the first and second polarization components, respectively. The modulation assembly 380 may be in the form of first and second modulating elements 381, 382 which may be electro-optic intensity modulators (e.g., liquid crystal based intensity modulators) known in the art, along with a control unit 383. The first and second modulating elements 381, 382 may operate under control of two distinct alternating (or "dither") control signals (e.g., provided by the control unit 383), which in one form may be sinusoidal functions of time at two distinct frequencies (e.g., first and second "dither frequencies"). Either of the modulating elements 381, 382 may be configured to introduce a "dither modulation signal" in the optical power level of its corresponding optical beam that includes a substantially linear response to the control signal to which it is subject. As such, upon emerging from the first and second beam-modulating elements 381, 382, the first and second polarization components may carry first and second dither modulation signals (e.g., characterized by the first and second dither frequencies), respectively. Consequently, the first and second sets of optical beams diffracted from the diffraction grating 120 also carry the respective dither modulation signals, impinging onto the optical-sensing array 160. The electrical signals thus generated by the optical-sensing array 160 likewise contain the same characteristic dither modulation signals, which may be detected by a synchronous detection unit 390 in communication with the optical-sensing array 160. As will be appreciated by those skilled in the art, the synchronous detection unit 390 may also be in communication with the control unit 383, if so desired in a practical application.

In the present invention, a "spectral channel" is characterized by a distinct center wavelength and associated bandwidth, and may carry a unique information signal as in WDM optical networking applications. A "dither modulation signal" refers to any modulation in the optical power level of an optical signal produced by the modulation assembly, in contrast with other "intrinsic" modulation signals (e.g., information signals) the input multi-wavelength optical signal may carry. Accordingly, the dither modulation signals are allocated in a spectral range that is sufficiently separated from the frequencies of other "intrinsic" modulation signals the spectral channels may carry.

As in the case of FIG. 2, the first and second sets of optical beams in the embodiment of FIG. 3 may each have a predetermined alignment with the underlying optical-sensing array 160. Alternatively, the first and second optical beams associated with the same wavelength (e.g., $\lambda_i$) may impinge at substantially the same location (or within the same optical power sensor) on the optical-sensing array 160. In either scenario, the distinct dither modulation signals carried by these two sets of optical beams enable them to separately detected, e.g., by use of the synchronous detection unit 390. To relate the measurements provided by the synchronous detection unit 390 to the corresponding optical power levels in the input multi-wavelength optical signal, a calibration process may be undertaken, whereby an optical power spectrum associated with each polarization component in the input multi-wavelength optical signal can be derived. From the teachings of the present invention, those skilled in the art will know how to implement a suitable optical-sensing array and devise an appropriate detection scheme, to best suit a given application.

The modulation assembly 380 may also be provided by an optical beam-chopper (along with an associated control unit), e.g., an opaque rotating disk equipped with two groups of apertures. Each group of apertures effectively "chops" its corresponding optical beam (e.g., the first or second polarization component) at a frequency determined by the spatial arrangement of its constituent apertures. By arranging the two groups of apertures according to a desired scheme, the first and second sets of optical beams arriving at the optical-sensing array 160 may be characterized by distinct modulations, thereby enabling them to be separately detected. It should be appreciated that the modulation assembly 380 (e.g., the first and second modulation elements 381, 382) may be alternatively implemented between the diffraction grating 140 and the optical-sensing array 160, so as to modulate the first and second sets of optical beams, respectively. As will be appreciated from the teachings of the present invention, those skilled in the art will know how to implement an appropriate modulation assembly in an optical spectral power monitoring apparatus according to the present invention, to best suit a given application.

In the above embodiments, the polarization-separating element 120 may be a polarizing beam splitter, a birefringent beam displacer, or other types of polarization-separating means known in the art. The polarization-rotating element 130, or the auxiliary polarization-rotating element 170, may be a half-wave plate, a Faraday rotator, a liquid crystal rotator, or any other polarization-rotating means known in the art that is capable of rotating the polarization of an optical beam by a prescribed degree (e.g., 90-degrees). Either of the first and second shutter elements 281, 282 may be a liquid crystal based shutter element, e.g., comprising a liquid crystal rotator that rotates the polarization of an incident optical beam by 90-degrees in the absence of any control signal and leaves the polarization unchanged under an appropriate control signal, in conjunction with a polarizer whose polarization axis is perpendicular to the thus-rotated polarization produced by the liquid crystal rotator. Either of the first or second shutter elements 281, 282 may also be an MEMS (micro-electro-mechanical-systems) based element that acts as a mechanical shutter, or any other shutter-like element known in the art that opens, or remains closed, to an incident optical beam by way of a suitable actuation means. The control unit 283 may include electrical circuits and signal control algorithms known in the art, for controlling the first or second shutter elements 281, 282 according to a desired scheme.

Moreover, either of the first and second modulation elements 381, 382 may be an electro-optic intensity modulator, such as a liquid crystal intensity modulator, or any other suitable modulation means known in the art. A skilled artisan will know how to devise an appropriate control unit 383, such that desired dither modulation signals are produced by the first and second modulating elements 381, 382. The synchronous detection unit 390 generally comprises electrical circuits and signal processing algorithms devised for performing synchronous detection of the dither modulation signals thus produced in the first and second sets of optical beams, respectively.

In the present invention, the wavelength disperser (e.g., the diffraction grating) 140 may be a ruled diffraction grating, a holographic diffraction grating, or an echelle grating, all commonly employed in the art for separating a multi-wavelength signal by wavelengths. In general, the wavelength-disperser 140 in an optical spectral power monitoring apparatus of the present invention may also be embodied by other types of wavelength-separating means known in the art, such as a transmission diffraction grating or a dispersing prism. The beam-focuser 140 may alternatively be an assembly of focusing lenses, or any other suitable beam-focusing means known in the art. The focusing function may also be accomplished by a curved diffraction grating that serves a dual function of wavelength separating and beam focusing. The fiber collimator serving as the input port 110 may be in the form of a collimating lens (such as a GRIN lens) and a ferrule-mounted fiber packaged together in a mechanically rigid stainless steel (or glass) tube.

It should be understood that the aforementioned embodiments are shown in schematic form, for illustrative purpose only. Various elements and optical beams are not drawn to scale. In general, there can be any number of the spectral channels in an optical spectral power monitoring apparatus of the present invention, so long as the underlying optical-sensing array employed is adequate for providing optical power measurements with desired accuracy.

Those skilled in the art will recognize that the exemplary embodiments described above provide only a few of many optical spectral power monitoring systems according to the present invention. Various means and methods can be devised to perform the designated functions in an equivalent manner. Moreover, various changes, substitutions, and alternations can be made herein without departing from the principles and the scope of the invention. As will be appreciated from the teachings of the present invention, one skilled in the art will know how to design an optical spectral power monitoring apparatus employing a suitable polarization diversity scheme, to best suit a given application.

Accordingly, the scope of the present invention should be determined by the following claims and their legal equivalents.

What is claimed is:

1. An optical apparatus, comprising:
    an input port, providing a multi-wavelength optical signal;
    a polarization-separating element tat decomposes said multi-wavelength optical signal into first and second polarization components;
    a polarization-rotating element that rotates a polarization of said second polarization component by approximately 90-degrees;

a wavelength-dispenser that separates said first and second polarization components by wavelength into first and second sets of optical beams respectively;

an array of optical power sensors, positioned to receive said first and second sets of optical beams; and a modulation assembly, which is adapted to modulate said first and second sets of optical beams prior to impinging onto said array of optical power sensors, such that said first and second sets of optical beams impinge onto said array of optical power sensors in a time-division-multiplexed sequence.

2. The optical apparatus of claim 1 wherein said modulation assembly comprises first and second shutter-elements.

3. The optical apparatus of claim 2 wherein said first shutter-element comprises an element selected from the group consisting of liquid crystal based shutter elements and MEMS based shutter elements.

4. The optical apparatus of claim 3 wherein said second shutter-element comprises an element selected from the group consisting of liquid crystal based shutter elements and MEMS based shutter elements.

5. The optical apparatus of claim 2 further comprising a control unit, in communication with said first and second shutter-elements.

6. An optical apparatus, comprising:

an input port, providing a multi-wavelength optical signal;

polarization-separating element that decomposes said multi-wavelength optical signal into first and second polarization components;

a polarization-rotating element that rotates a polarization of said second polarization component by approximately 90-degrees;

a wavelength-disperser that separates said first and second polarization by wavelength into first and second sets of optical beams respectively;

an array of optical power sensors, positioned to receive said first and second sets of optical beams; and a modulation assembly, which is adapted to modulate said first and second sets of optical beams prior to impinging onto said array of optical power sensors, and which comprises first and second modulating elements, adapted to cause said first and second sets of optical beams to carry distinct dither modulation signals upon impinging onto said array of optical power sensors.

7. The optical apparatus of claim 6 wherein said first modulating element comprises an electro-optic intensity modulator.

8. The optical apparatus of claim 7 wherein said second modulating element comprises an electro-optic intensity modulator.

9. The optical apparatus of claim 6 further comprising a control unit, in communication with said first and second modulating elements.

10. The optical apparatus of claim 6 further comprising a synchronous detection unit, configured to detect said dither modulation signals.

11. An optical apparatus, comprising:

an input port, providing a multi-wavelength optical signal;

a polarization-separating element that decomposes said multi-wavelength optical signal into first and second polarization components;

a polarization-rotating element that rotates a polarization of said second polarization component by approximately 90-degrees;

a wavelength-disperser that separates said first and second polarization components by wavelength into first and second sets of optical beams respectively;

an array of optical power sensors, positioned to receive said first and second sets of optical beams; and a modulation assembly, which is adapted to modulate said first and second sets of optical beams prior to impinging onto said array of optical power sensors, and which comprises an optical beam-chopper.

12. An optical apparatus, comprising:

an input port, providing a multi-wavelength optical signal;

a polarization-rotating element that decomposes said multi-wavelength optical signal into first and second polarization components;

a polarization-rotating element that rotates a polarization of said second polarization component by approximately 90-degrees;

a wavelength-disperser that separates said first and second polarization components by wavelength into first and second sets of optical beams respectively;

an array of optical power sensors, positioned to receive said first and second sets of optical beams; and a modulation assembly, which is adapted to modulate said first and second sets of optical beams prior to impinging onto said array of optical power sensor, and which is in optical communication with said polarization-separating element along with said polarization-rotating element and said wavelength-disperser, thereby controlling said first and second polarization components.

13. An optical apparatus comprising:

an input port, providing a multi-wavelength optical signal;

a polarization-separating element that decomposes said multi-wavelength optical signal into first and second polarization components;

a polarization-rotating element that rotates a polarization of said second polarization component by approximately 90-degrees;

a wavelength-disperser that separates said first and second polarization components by wavelength into first and second sets of optical beams respectively;

an array of optical power sensors, positioned to receive said first and second sets of optical beams; and a modulation assembly, which is adapted to modulate said first and second sets of optical beams prior to impinging onto said array of optical power sensors, and which is in optical communication with said wavelength-disperser and said array of optical power sensors, so as to control said first and second sets of optical beams.

14. The optical apparatus of claim 1 wherein said polarization-separating element comprises an element selected from the group consisting of polarizing beam splitters and birefringent beam displacers.

15. The optical apparatus of claim 1 wherein said polarization-rotating element comprises an element selected from the group consisting of half-wave plates, Faraday rotators, and liquid crystal rotators.

16. The optical apparatus of claim 1 wherein said array of optical power sensors comprises a photodiode array.

17. The optional apparatus of claim 1 wherein said wavelength-disperser comprises an element selected from the group consisting of ruled diffraction gratings, holographic gratings, echelle gratings, curved diffraction gratings, transmission gratings, and dispersing gratings.

18. The optical apparatus of claim 1 wherein said input port comprises a fiber collimator.

19. The optical apparatus of claim 1 further comprises a beam-focuser for focusing said first and second sets of optical beams into corresponding focused spots.

20. The optical apparatus of claim 19 wherein said beam-focuser comprises at least one focusing lens.

21. A method of optical spectral power monitoring using a polarization diversity scheme, comprising:

providing a multi-wavelength optical signal;

decomposing said multi-wavelength optical signal into first and second polarization components;

rotating a polarization of said second polarization component by approximately 90-degrees;

separating said first and second polarization components by wavelength respectively into first and second sets of optical beams;

impinging said first and second sets of optical beams onto an array of optical power sensors; and modulating said first and second sets of optical beams, respectively;

wherein said first and second sets of optical beams are modulated to impinge onto an array of optical power sensors in a time-division-multiplexed sequence.

22. The method of claim 21 further comprising the step of rotating a polarization of said second set of optical beams each by approximately 90-degrees, prior to impinging onto said array of optical power sensors.

23. The method of claim 21 further comprising the step of rotating a polarization of said first set of optical beams each by approximately 90-degrees, prior to impinging onto said array of optical power sensors.

24. The method of claim 21 wherein said first and second sets of optical beams are modulated to carry distinct dither modulation signals, upon impinging onto said array of optical power sensors.

25. The method of claim 24 further comprising the step of performing synchronous detection of said dither modulation signals.

* * * * *